(12) United States Patent
Li et al.

(10) Patent No.: US 10,038,312 B2
(45) Date of Patent: Jul. 31, 2018

(54) HIGH-VOLTAGE COMBINED ELECTRICAL APPARATUS

(71) Applicant: Siemens Aktiengesellschaft, Munich (DE)

(72) Inventors: Yan Song Li, Jinan (CN); Xue Hua Lu, Shanghai (CN); Yi Fei Ni, Ningbo (CN); Yong Hui Wang, Hangzhou (CN); Jian Zhou, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/506,879

(22) PCT Filed: Aug. 20, 2015

(86) PCT No.: PCT/EP2015/069153
§ 371 (c)(1),
(2) Date: Feb. 27, 2017

(87) PCT Pub. No.: WO2016/030271
PCT Pub. Date: Mar. 3, 2016

(65) Prior Publication Data
US 2017/0256923 A1 Sep. 7, 2017

(30) Foreign Application Priority Data

Aug. 29, 2014 (CN) .......................... 2014 1 0438749

(51) Int. Cl.
*H02B 5/06* (2006.01)
*H02B 1/26* (2006.01)
(Continued)

(52) U.S. Cl.
CPC ................. *H02B 5/06* (2013.01); *H02B 1/04* (2013.01); *H02B 1/20* (2013.01); *H02B 1/26* (2013.01); *H02B 1/28* (2013.01)

(58) Field of Classification Search
CPC .... H02B 13/0356; H02B 11/04; H02B 1/056; H02B 11/26; H02B 13/065; H02B 5/06;
(Continued)

(56) References Cited

U.S. PATENT DOCUMENTS 2,666,107 A * 1/1954 Leeds ................ H01H 33/7023
174/212
3,386,059 A * 5/1968 Stein, Jr. ................. H01F 38/20
174/30

(Continued)

FOREIGN PATENT DOCUMENTS

| CN | 101976804 A | 2/2011 |
| CN | 101980407 A | 2/2011 |

(Continued)

*Primary Examiner* — Adam B Dravininkas
(74) *Attorney, Agent, or Firm* — Harness, Dickey & Pierce, P.L.C.

(57) ABSTRACT

A high-voltage combined electrical apparatus includes a transformer, at least one circuit breaker, at least one oil/gas separation module and at least one operating mechanism. In an embodiment, the circuit breaker includes a ceramic insulator, an upper outgoing line seat, a lower outgoing line seat, and a disconnecting mechanism connected there between. The oil/gas separation module includes a first end electrically connected to a transformer coil of the transformer, and a second end electrically connected to the lower outgoing line seat. The operating mechanism is connected to and controls the disconnecting mechanism. The high-voltage combined electrical apparatus of an embodiment integrates a circuit breaker and a transformer, omitting the conventional transformer oil/gas sleeve and overhead line, so that the structure thereof is simpler, the cost is lower, the area of ground occupied by the equipment is reduced, and the occurrence of short circuits associated with overhead lines is avoided.

19 Claims, 4 Drawing Sheets

(51) Int. Cl.
*H02B 1/20* (2006.01)
*H02B 1/04* (2006.01)
*H02B 1/28* (2006.01)

(58) Field of Classification Search
CPC ... H02B 1/28; H02B 1/04; H02B 1/26; H02B 1/20; H02J 5/005; H02J 7/025; H02J 17/00; H02J 50/12
See application file for complete search history.

(56) References Cited

U.S. PATENT DOCUMENTS

| | | | |
|---|---|---|---|
| 4,484,169 A | 11/1984 | Nishikawa | |
| 5,206,616 A * | 4/1993 | Stegmuller | H01H 33/666 218/136 |
| 6,198,062 B1 * | 3/2001 | Mather | H01H 33/022 218/120 |
| 6,850,399 B1 * | 2/2005 | Kato | G01R 15/142 361/132 |
| 2005/0135029 A1 * | 6/2005 | Kato | H01H 33/027 361/64 |

FOREIGN PATENT DOCUMENTS

| | | |
|---|---|---|
| CN | 202059092 U | 11/2011 |
| CN | 203722058 U | 7/2014 |
| EP | 0822632 A2 | 2/1998 |
| EP | 1113547 A1 | 7/2001 |
| EP | 1113549 A1 | 7/2001 |
| FR | 2515860 A1 | 5/1983 |

* cited by examiner

HIGH-VOLTAGE COMBINED ELECTRICAL APPARATUS

PRIORITY STATEMENT

This application is the national phase under 35 U.S.C. § 371 of PCT International Application No. PCT/EP2015/069153 which has an International filing date of Aug. 20, 2015, which designated the United States of America and which claims priority to Chinese patent application number CN 201410438749.4 filed Aug. 29, 2014, the entire contents of which are hereby incorporated herein by reference.

FIELD

An embodiment of present invention generally relates to a high-voltage combined electrical apparatus, in particular a combined electrical apparatus having a high-voltage switch and a transformer.

BACKGROUND ART

In electric power systems, especially high-voltage transformer substations, high-voltage switches and transformers connected by overhead lines are often used. This design requires a large amount of space, and there is the possibility of an accidental short circuit occurring between an overhead line and the ground, for example a short circuit caused by lightning. In this process, a high-voltage switch will be unable to protect a transformer, so that the transformer suffers damage. Moreover, once installed, high-voltage switches (e.g. ceramic column circuit breakers) and transformers occupy a large area of ground. With land resources becoming ever scarcer and more expensive, and requirements on the reliability of electric power systems becoming ever more exacting, this design needs to be improved.

SUMMARY

At least one embodiment of the invention provides for a high-voltage combined electrical apparatus. This high-voltage combined electrical apparatus comprises a transformer, at least one circuit breaker, at least one oil/gas separation module and at least one operating mechanism, wherein the circuit breaker comprises a ceramic insulator, an upper outgoing line seat, a lower outgoing line seat, and a circuit-breaking mechanism connected between the upper outgoing line seat and the lower outgoing line seat. The oil/gas separation module has a first end electrically connected to a transformer coil of the transformer, and a second end electrically connected to the lower outgoing line seat. The operating mechanism is connected to and controls the circuit-breaking mechanism. The high-voltage combined electrical apparatus of the present invention integrates a ceramic column circuit breaker and a transformer, omitting the conventional transformer oil/gas sleeve and overhead line, so that the overall structure thereof is simpler, the cost is lower, the area of ground occupied by the equipment is reduced, and the occurrence of short circuits associated with overhead lines is avoided.

The explanation above is merely an overview of technical solutions of embodiments of the present invention. To enable the technical aspects of embodiments of the present invention to be understood more clearly and be implemented in accordance with the content of the description, and to make the abovementioned and other objects, features and advantages of embodiments of the present invention more obvious and easier to understand, a detailed explanation is given below by way of preferred embodiments, in conjunction with the accompanying drawings.

BRIEF DESCRIPTION OF THE DRAWINGS

Example embodiments of the present invention are described in detail below with reference to the accompanying drawings, to give those skilled in the art a clearer understanding of the abovementioned and other features and advantages of the present invention. In the drawings.

Figure 1:
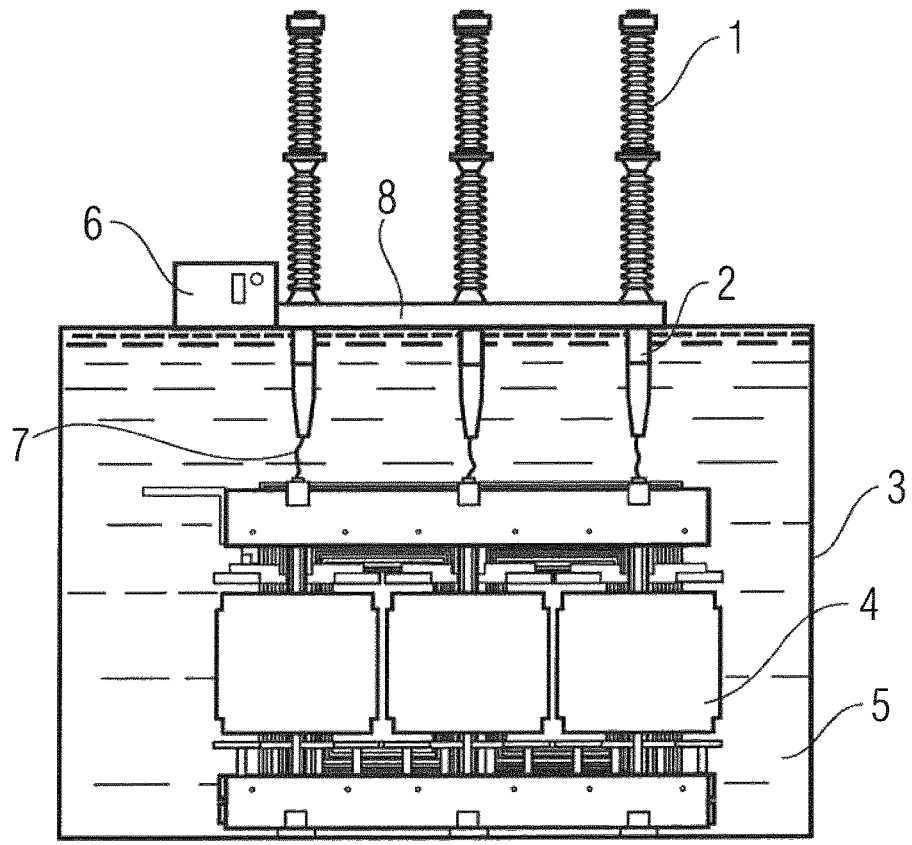
FIG. 1 shows a schematic diagram of a high-voltage combined electrical apparatus according to an embodiment of the present invention.

The labels used in the drawings are as follows:

| | | | |
|---|---|---|---|
| 1 | circuit breaker | 3 | transformer |
| 11 | ceramic insulator | 31 | transformer housing |
| 111 | upper outgoing line seat | 32 | support platform |
| 112 | lower outgoing line seat | 33 | rib |
| 2 | oil/gas separation module | 4 | transformer coil |
| 21 | oil/gas separation module housing | 5 | insulating oil |
| 22 | insulating support base | 6 | operating mechanism |
| 23 | insulator | 61 | pull rod |
| 24 | seal | 7 | lead wire |
| | | 8 | connecting rod compartment |

DETAILED DESCRIPTION OF THE EXAMPLE EMBODIMENTS

At least one embodiment of the invention provides for a high-voltage combined electrical apparatus. This high-voltage combined electrical apparatus comprises a transformer, at least one circuit breaker, at least one oil/gas separation module and at least one operating mechanism, wherein the circuit breaker comprises a ceramic insulator, an upper outgoing line seat, a lower outgoing line seat, and a circuit-breaking mechanism connected between the upper outgoing line seat and the lower outgoing line seat. The oil/gas separation module has a first end electrically connected to a transformer coil of the transformer, and a second end electrically connected to the lower outgoing line seat. The operating mechanism is connected to and controls the circuit-breaking mechanism. The high-voltage combined electrical apparatus of the present invention integrates a ceramic column circuit breaker and a transformer, omitting the conventional transformer oil/gas sleeve and overhead line, so that the overall structure thereof is simpler, the cost is lower, the area of ground occupied by the equipment is reduced, and the occurrence of short circuits associated with overhead lines is avoided.

According to one embodiment of the present invention, the circuit breaker is disposed at the top of the transformer, while the first end of the oil/gas separation module is electrically connected to the transformer coil via a lead wire. Having the circuit breaker positioned at the top of the transformer helps to further reduce the area of ground occupied by the high-voltage combined electrical apparatus.

According to another embodiment of the present invention, the high-voltage combined electrical apparatus has three the circuit breakers, three the oil/gas separation modules and one the operating mechanism. The use of one operating mechanism to simultaneously operate three circuit breakers helps to ensure synchrony of operation among the three circuit breakers.

According to another embodiment of the present invention, the high-voltage combined electrical apparatus also comprises a connecting rod compartment fixed to a transformer housing, the lower outgoing line seats of the three circuit breakers are connected individually to the top of the connecting rod compartment, while the second ends of the three oil/gas separation modules are connected individually to the bottom of the connecting rod compartment. The connecting rod compartment can achieve synchronous operation of the three circuit breakers.

According to another embodiment of the present invention, the circuit breaker is disposed at a side of the transformer. Having the circuit breaker positioned at a side of the transformer helps to reduce the height of the transformer.

According to another embodiment of the present invention, the high-voltage combined electrical apparatus comprises three the circuit breakers and three the oil/gas separation modules. The first end of each of the oil/gas separation modules is connected mechanically to a housing of the transformer, and the second end thereof is connected mechanically to the lower outgoing line seat; the oil/gas separation module also comprises a third end, and a pull rod passes through the second end, the third end and the lower outgoing line seat, and connects the circuit-breaking mechanism and the operating mechanism. The oil/gas separation modules can ensure the separation of insulating oil in the transformer from insulating gas in the circuit breaker, while allowing the mechanical operation of the circuit breaker by the operating mechanism.

According to another embodiment of the present invention, the high-voltage combined electrical apparatus comprises a support platform fixed to a side of the transformer housing, and the third end of each of the oil/gas separation modules is fixed mechanically to the support platform. The support platform helps to increase the strength of that part of the high-voltage combined electrical apparatus which supports the circuit breaker.

According to another embodiment of the present invention, the high-voltage combined electrical apparatus comprises three the operating mechanisms, each pull rod individually connecting one the circuit-breaking mechanism and one the operating mechanism. By using three operating mechanisms to operate the circuit breakers individually, a connecting rod mechanism between circuit breakers can be omitted, so that the structure is simpler.

According to another embodiment of the present invention, the high-voltage combined electrical apparatus has just one operating mechanism, and also comprises a connecting rod mechanism connected to the single operating mechanism. The use of one operating mechanism to simultaneously operate three circuit breakers helps to ensure synchrony of operation among the three circuit breakers, and also saves costs.

According to another embodiment of the present invention, the oil/gas separation module comprises an oil/gas separation module housing and an insulating support base. The lower outgoing line seat passes through a second end of the oil/gas separation module and is connected to the transformer via an insulator. An upper part of a pull rod passes through the lower outgoing line seat and is connected to the circuit-breaking mechanism, while a lower part of the pull rod passes through the insulating support base and is connected to the operating mechanism, and maintains gas-tightness via a seal. The oil/gas separation module can achieve separation of oil and gas very well.

The present invention is explained in further detail below by way of embodiments, to clarify the object, technical solution and advantages thereof.

FIG. 1 shows schematically a high-voltage combined electrical apparatus according to an embodiment of the present invention. This high-voltage combined electrical apparatus has a transformer 3, three circuit breakers 1, three oil/gas separation modules 2 and one operating mechanism 6. Those skilled in the art will understand that since the number of circuit breakers, oil/gas separation modules and operating mechanisms may be selected according to actual requirements, the high-voltage combined electrical apparatus comprises at least one circuit breaker, at least one oil/gas separation module and at least one operating mechanism.

Figure 2:
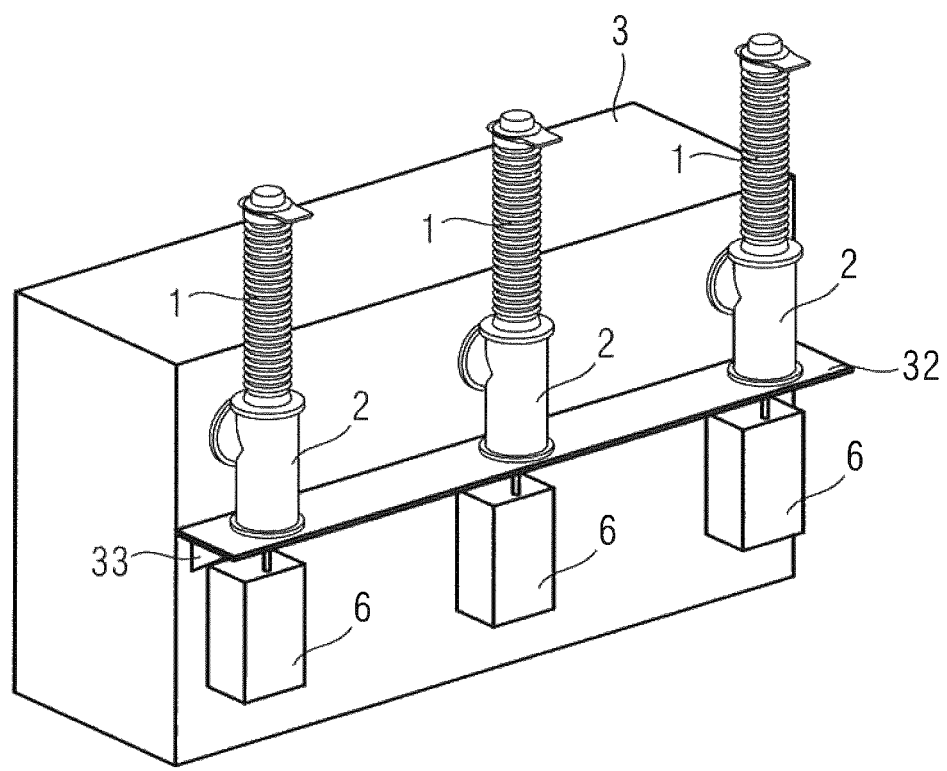
FIG. 2 shows schematically a perspective drawing of a high-voltage combined electrical apparatus according to another embodiment of the present invention.

Each circuit breaker 1 may, as shown in FIG. 2, comprise a ceramic insulator 11, an upper outgoing line seat 111, a lower outgoing line seat 112, and a circuit-breaking mechanism 113 connected between the upper outgoing line seat 111 and the lower outgoing line seat 112. Each oil/gas separation module 2 has a first end electrically connected to a transformer coil 4 of the transformer 3, and a second end electrically connected to the lower outgoing line seat 112. The operating mechanism 6 is connected to and controls the circuit-breaking mechanism 113. Each circuit breaker 1 is disposed at the top of the transformer 3, while the first end of each oil/gas separation module 2 is electrically connected to the transformer coil 4 via a lead wire 7.

The high-voltage combined electrical apparatus of an embodiment of the present invention integrates a ceramic column circuit breaker and a transformer, omitting the conventional transformer oil/gas sleeve and overhead line, so that the overall structure thereof is simpler, the cost is lower, the area of ground occupied by the equipment is reduced, and the occurrence of short circuits associated with overhead lines is avoided. The high-voltage combined electrical apparatus also comprises a connecting rod compartment 8 fixed to a transformer housing 31. The lower outgoing line seats 112 of the three circuit breakers 1 are connected individually to the top of the connecting rod compartment 8, while the second ends of the three oil/gas separation modules 2 are connected individually to the bottom of the connecting rod compartment 8. Those skilled in the art will understand that the connecting rod compartment 8 is by no means necessary, but can achieve synchronous operation of the three circuit breakers.

In another embodiment of the present invention which is not shown, the high-voltage combined electrical apparatus in FIG. 1 may also comprise three circuit breakers, three oil/gas separation modules and three operating mechanisms. In this case, each operating mechanism independently controls one circuit breaker. Having the circuit breakers positioned at the top of the transformer helps to further reduce the area of ground occupied by the high-voltage combined electrical apparatus, while the use of one operating mechanism to simultaneously operate three circuit breakers helps to ensure synchrony of operation among the three circuit breakers.

Figure 3:
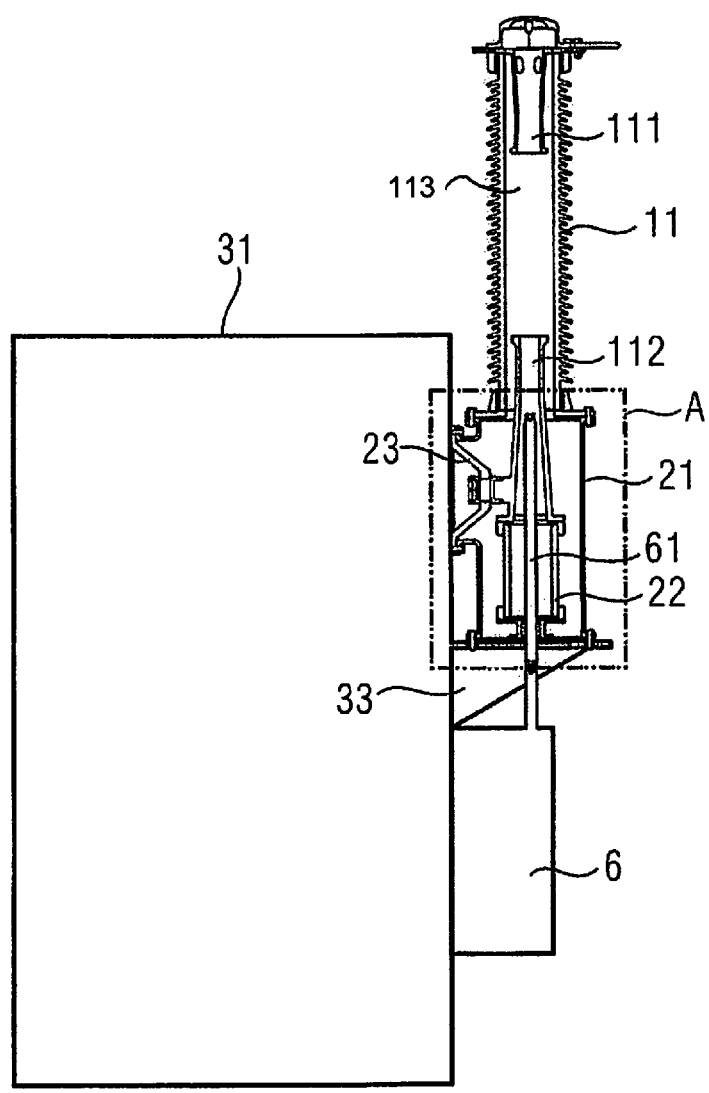
FIG. 3 shows schematically a local sectional view of the high-voltage combined electrical apparatus in FIG. 2.
Figure 4:
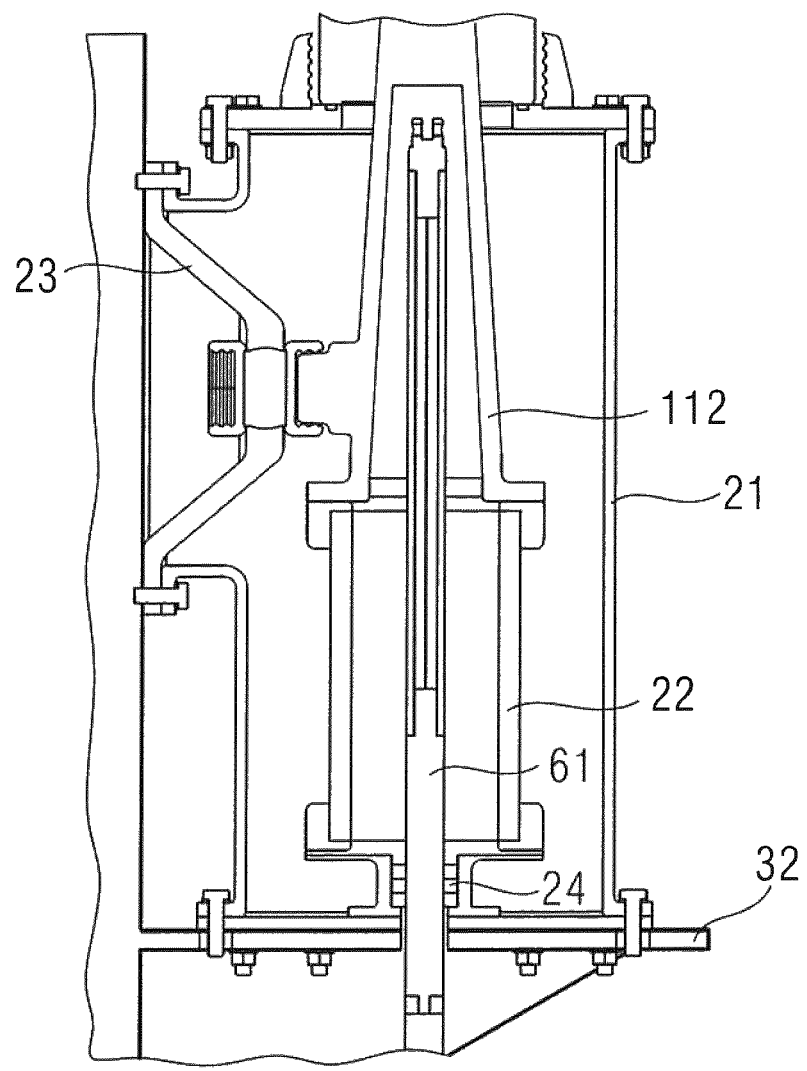
FIG. 4 shows schematically a magnified drawing of part A in FIG. 3.

FIGS. 2, 3 and 4 show schematically perspective drawings of a high-voltage combined electrical apparatus according to another embodiment of the present invention, wherein circuit breakers 1 are disposed at a side of a transformer 3. The high-voltage combined electrical apparatus comprises three circuit breakers 1 and three oil/gas separation modules 2. Each oil/gas separation module 2 has a first end connected mechanically to a housing 31 of the transformer 3, and a second end connected mechanically to a lower outgoing line seat 112. The oil/gas separation module 2 also comprises a third end, wherein a pull rod 61 passes through the second end, third end and lower outgoing line seat 112, and connects a circuit-breaking mechanism 113 and an operating mechanism 6.

In the case where the strength of the connection between the transformer housing and the oil/gas separation module is inadequate, the high-voltage combined electrical apparatus may also comprise a support platform 32. The support platform 32 is fixed (preferably by welding) to a side of the transformer housing 31, and the third end of each oil/gas separation module 2 is fixed mechanically to the support platform 32. The oil/gas separation modules can ensure the separation of insulating oil in the transformer from insulating gas in the circuit breaker, while allowing the mechanical operation of the circuit breaker by the operating mechanism.

The high-voltage combined electrical apparatus shown in FIG. 2 comprises three operating mechanisms 6, each pull rod 61 individually connecting one circuit-breaking mechanism 113 and one operating mechanism 6. By using three operating mechanisms to operate the circuit breakers individually, a connecting rod mechanism between circuit breakers can be omitted, so that the structure is simpler. Those skilled in the art will understand that the high-voltage combined electrical apparatus may also have just one operating mechanism 6, and also comprise a connecting rod mechanism connected to the operating mechanism 6. It will then be possible to control multiple circuit breakers simultaneously using one operating mechanism. The use of one operating mechanism to simultaneously operate three circuit breakers helps to ensure synchrony of operation among the three circuit breakers, and also saves costs.

FIG. 4 shows schematically a magnified drawing of part A in FIG. 3. The oil/gas separation module 2 comprises an oil/gas separation module housing 21 and an insulating support base 22. The lower outgoing line seat 112 passes through the second end of the oil/gas separation module 2 and is connected to the transformer 3 via an insulator 23.

An upper part of a pull rod 61 passes through the lower outgoing line seat 112 and is connected to the circuit-breaking mechanism 113, while a lower part of the pull rod 61 passes through the insulating support base 22 and is connected to the operating mechanism 6, and maintains gas-tightness via a seal 24. The oil/gas separation module housing 21 of the oil/gas separation module 2 is made of metal, while the lower outgoing line seat 112 installed therein is made of an electrically conductive material. The upper part of the pull rod 61 is made of an insulating material, passes through the lower outgoing line seat 112 and is connected to the circuit-breaking mechanism 113. The lower outgoing line seat 112 passes through the second end of the oil/gas separation module 2, and the pull rod 61 maintains the gas-tightness of the oil/gas separation module 2 via the seal 24. The lower outgoing line seat 112 is connected to the transformer 3 via insulator 23. Insulator 23 is at the same time used to achieve separation of oil and gas, and maintains the gas-tightness of the oil/gas separation module 2.

The internal structure of the transformer of an embodiment of the present invention is the same as that of a conventional transformer. Changing the installation position of the original outlet sleeve enables it to be adapted to the installation of post terminals of a ceramic column circuit breaker, and enhances mechanical strength.

The principle of the circuit breaker of an embodiment of the present invention is the same as that of a conventional ceramic column circuit breaker. Connection to an arc-extinguishing chamber is achieved by moving the original operating lever to the outside, and by designing, inside the ceramic insulator, a conductor connected to the oil/gas separation module. Since it is necessary to move the operating lever to the outside, the direction-changing part of the transmission chain must be designed to be between two ceramic insulators. Therefore the part between the two ceramic insulators requires a sealing housing.

The above embodiments are merely preferred embodiments of the present invention, which are not intended to limit it. Any amendments, equivalent substitutions or improvements etc. made within the spirit and principles of the present invention shall be included in the scope of protection thereof.

The invention claimed is:

1. A high-voltage combined electrical apparatus, comprising:
   a transformer including a transformer coil;
   three circuit breakers, each of the three circuit breakers including a ceramic insulator, an upper outgoing line seat, a lower outgoing line seat, and a circuit-breaking mechanism connected between the upper outgoing line seat and the lower outgoing line seat;
   three oil/gas separation modules, each of the three oil/gas separation module including a first end electrically connected to the transformer coil of the transformer, and a second end electrically connected to the lower outgoing line seat; and
   an operating mechanism, connected to and configured to control the circuit-breaking mechanism,
   wherein each of the three circuit breakers are disposed at a relatively top portion of the transformer, and wherein the first ends of each of the three oil/gas separation modules are electrically connected to the transformer coil via a lead wire.

2. The high-voltage combined electrical apparatus of claim 1, further comprising:
   a connecting rod compartment fixed to a housing of the transformer, the lower outgoing line seats of the three circuit breakers each being respectively connected, individually, to a top portion of the connecting rod compartment, and the second ends of the three oil/gas separation modules each being respectively connected, individually, to a bottom portion of the connecting rod compartment.

3. The high-voltage combined electrical apparatus of claim 2, wherein each of the three oil/gas separation modules includes an oil/gas separation module housing and an insulating support base, the lower outgoing line seat passing through a second end of a respective one of the three oil/gas separation modules and being connected to the transformer via an insulator; wherein an upper part of a pull rod passes through the lower outgoing line seat and is connected to the circuit-breaking mechanism; and wherein a lower part of the pull rod passes through the insulating support base and is connected to the operating mechanism, and maintains gas-tightness via a seal.

4. The high-voltage combined electrical apparatus of claim 2, wherein the three circuit breakers are disposed at a side of the transformer.

5. The high-voltage combined electrical apparatus of claim 4, wherein the first end of each of the three oil/gas separation modules is connected mechanically to a housing of the transformer, wherein the second end of each of the three oil/gas separation modules is connected mechanically to the lower outgoing line seat; and wherein each of the three oil/gas separation modules further includes a third end, a pull rod passing through the second end, the third end and the lower outgoing line seat, and connecting the circuit-breaking mechanism and the operating mechanism.

6. The high-voltage combined electrical apparatus of claim 5, further comprising:
 a support platform fixed to a side of the transformer housing, wherein the third end of each of the three oil/gas separation modules is fixed mechanically to the support platform.

7. The high-voltage combined electrical apparatus of claim 6, wherein the operating mechanism includes three operating mechanisms, each said pull rod individually connecting a respective one said circuit-breaking mechanism and a respective one said three operating mechanism.

8. The high-voltage combined electrical apparatus of claim 6, wherein the operating mechanism includes one single operating mechanism, the high-voltage combined electrical apparatus further comprising a connecting rod mechanism connected to the one single operating mechanism.

9. The high-voltage combined electrical apparatus of claim 1, wherein at least one of the three circuit breakers is disposed at a side of the transformer.

10. The high-voltage combined electrical apparatus of claim 9, wherein the first end of each of the three oil/gas separation modules is connected mechanically to a housing of the transformer, wherein the second end of each of the three oil/gas separation modules is connected mechanically to the lower outgoing line seat; and wherein each of the three oil/gas separation modules further includes a third end, a pull rod passing through the second end, the third end and the lower outgoing line seat, and connecting the circuit-breaking mechanism and the operating mechanism.

11. The high-voltage combined electrical apparatus of claim 10, further comprising:
 a support platform fixed to a side of the transformer housing, wherein the third end of each of the three oil/gas separation modules is fixed mechanically to the support platform.

12. The high-voltage combined electrical apparatus of claim 11, wherein the operating mechanism includes three operating mechanisms, each respective pull rod individually connecting a respective one said circuit-breaking mechanism and a respective one of said three operating mechanisms.

13. The high-voltage combined electrical apparatus of claim 11, wherein the operating mechanism includes one single operating mechanism, the high-voltage combined electrical apparatus further comprising a connecting rod mechanism connected to the one single operating mechanism.

14. The high-voltage combined electrical apparatus of claim 1, wherein the three oil/gas separation modules include an oil/gas separation module housing and an insulating support base, the lower outgoing line seat passing through a second end of a respective one oil/gas separation module and being connected to the transformer via an insulator; wherein an upper part of a pull rod passes through the lower outgoing line seat and is connected to the circuit-breaking mechanism; and wherein a lower part of the pull rod passes through the insulating support base and is connected to the operating mechanism, and maintains gas-tightness via a seal.

15. The high-voltage combined electrical apparatus of claim 1, wherein the operating mechanism includes one single operating mechanism.

16. The high-voltage combined electrical apparatus of claim 15, further comprising:
 a connecting rod compartment fixed to a housing of the transformer, the lower outgoing line seats of the three circuit breakers each being respectively connected, individually, to a top portion of the connecting rod compartment, and the second ends of the three oil/gas separation modules each being respectively connected, individually, to a bottom portion of the connecting rod compartment.

17. A high-voltage combined electrical apparatus, comprising:
 a transformer including a transformer coil;
 at least one circuit breaker including a ceramic insulator, an upper outgoing line seat, a lower outgoing line seat, and a disconnecting mechanism connected between the upper outgoing line seat and the lower outgoing line seat;
 at least one oil/gas separation module including a first end electrically connected to the transformer coil of the transformer, and a second end electrically connected to the lower outgoing line seat; and
 an operating mechanism, connected to and configured to control the disconnecting mechanism, the at least one circuit breaker being disposed at a relatively top portion of the transformer, and the first end of the at least one oil/gas separation module being electrically connected to the transformer coil via a lead wire, wherein the at least one oil/gas separation module includes an oil/gas separation module housing and an insulating support base, the lower outgoing line seat passing through a second end of the at least one oil/gas separation module and being connected to the transformer via an insulator; wherein an upper part of a pull rod passes through the lower outgoing line seat and is connected to the circuit-breaking mechanism; and wherein a lower part of the pull rod passes through the insulating support base and is connected to the operating mechanism, and maintains gas-tightness via a seal.

18. The high-voltage combined electrical apparatus of claim 17, wherein the at least one circuit breaker is disposed at a side of the transformer.

19. The high-voltage combined electrical apparatus of claim 17, wherein the at least one operating mechanism includes one single operating mechanism.

* * * * *